United States Patent [19]

Chassot et al.

[11] Patent Number: 5,641,350
[45] Date of Patent: Jun. 24, 1997

[54] ORGANIC PIGMENTS COATED WITH METAL PHOSPHATE COMPLEXES AND AMINES

[75] Inventors: Laurent Chassot, Praroman; Philippe Bugnon, Essert, both of Switzerland

[73] Assignee: Ciba-Geigy Corporation, Tarrytown, N.Y.

[21] Appl. No.: 569,435

[22] Filed: Dec. 8, 1995

[30] Foreign Application Priority Data

Dec. 15, 1994 [CH] Switzerland ............... 3795/94

[51] Int. Cl.$^6$ .................................................. C08K 5/00
[52] U.S. Cl. ................ 106/493; 106/413; 106/494; 106/495; 106/496; 106/497; 106/498; 106/499; 106/503; 106/31.75; 106/31.76; 106/31.77; 106/31.78; 106/31.8
[58] Field of Search ................. 106/493, 499, 106/503, 23 D, 23 H, 23 K, 22 D, 22 H, 22 K, 413, 494, 495, 496, 497, 498

[56] References Cited

U.S. PATENT DOCUMENTS

| 3,827,902 | 8/1974 | Schwerin et al. | 106/22 K |
|---|---|---|---|
| 3,946,134 | 3/1976 | Sherman | 428/403 |
| 4,220,473 | 9/1980 | Robertson | 106/23 K |
| 4,462,833 | 7/1984 | Hays et al. | 106/23 E |
| 4,576,649 | 3/1986 | Oliver et al. | 106/23 H |
| 5,522,925 | 6/1996 | Chassot et al. | 106/497 |

FOREIGN PATENT DOCUMENTS

| 0062304 | 10/1982 | European Pat. Off. . |
|---|---|---|
| 0528601 | 2/1993 | European Pat. Off. . |
| 91026767 | 2/1991 | Japan . |
| 1116567 | 6/1968 | United Kingdom . |
| 9113943 | 9/1991 | WIPO . |

OTHER PUBLICATIONS

Derwent Abstract 91/078,500/11 of JP 91/026,767 Feb. 1991.

*Primary Examiner*—Mark L. Bell
*Assistant Examiner*—Scott L. Hertzog
*Attorney, Agent, or Firm*—Michele Kovaleski

[57] ABSTRACT

Pigment compositions comprising an organic pigment whose particle surface is provided with a protective coating layer, which coating comprises (a) a metal phosphate complex in which the metal is selected from the group consisting of, zirconium, titanium and mixtures thereof in a quantity of from 0.5 to 100% by weight, preferably to 20% by weight, particularly preferably from 1 to 10% by weight, based on the pigment; and (b) an amine or ammonium salt, in a quantity of from 0.5 to 15% by weight, preferably up to 10% by weight, particularly preferably up to 5% by weight, based on the pigment. The compositions are distinguished by outstanding properties, especially by the high gloss of the colorations obtained therewith, by very good dispersibility, high dispersion stability and heat resistance and by very good rheological characteristics of the paint millbases or printing inks prepared therewith. The plastics pigmented with the compositions of the invention are likewise distinguished by good dispersibility.

31 Claims, No Drawings

ORGANIC PIGMENTS COATED WITH METAL PHOSPHATE COMPLEXES AND AMINES

The present invention relates to organic pigments whose particle surface is provided with a firmly adhering coating which comprises calcium, magnesium, aluminium, zinc, zirconium or titanium phosphate complexes and amines, and to their preparation and their use. They are distinguished by outstanding properties, especially by the high gloss of the colourations obtained therewith, by very good dispersibility and high dispersion stability, and by very good rheological characteristics of the paint millbases or printing inks prepared therewith.

GB 1 116 567, U.S. Pat. No. 3,827,902, U.S. Pat. No. 4,220,473, U.S. Pat. No. 4,462,833 and EP 062 304 disclose the treatment of azo pigments with various polyfunctional amines. In this context it is stated that this coating imparts, especially to yellow azo diarylide pigments, a better rheology in printing inks. WO 91/13943 discloses the treatment of pigment particles with polyalkyleneimine. In this context it is stated that this coating gives opaque azo pigments in particular a better stability to certain chemicals, better light stability, better rheology and better gloss in automotive paints.

However, dispersants in general, including amine-type dispersants, have the disadvantage that they are very specific, especially with regard to their activity on pigments: a specific dispersant is in each case suitable for only a few pigments and for only a few formulations to be pigmented. The incompatibility in numerous application systems of the dispersants which are best suited to specific pigments, and the ineffectiveness for many pigments of the dispersants which are best suited to specific application systems, are a considerable hindrance to the task of the person skilled in the art of application.

JP91/26 767 discloses modified diphenylpyrrolopyrrole pigments which are designated as dispersants, and pigment compositions comprising such dispersants. Said disclosure states that the formulations, inter alia, have better rheology and better gloss than dispersant-free pigments.

However, owing to their pigment-derived structure, such dispersants are coloured but do not themselves have the advantages of high-quality pigments. This results in unwanted alteration to the properties of the pigment compositions dispersed therewith, especially the migration fastness, light fastness and weathering stability of such compositions.

U.S. Pat. No. 3,946,134 discloses inter alia the coating of pigment particles with aluminium phosphate complexes or magnesium phosphate complexes. It is stated therein that this coating gives inorganic and organic pigments improved stability to chemicals and a better stability with respect to heat and light.

However, it is found that such coatings are unable to meet, to the desired extent, modern requirements relating in particular to dispersibility, transparency and gloss. It is also not possible to improve these properties satisfactorily by adding amine-type dispersants.

It has now been found that the coating of the pigment particles with a calcium, magnesium, aluminium, zinc, zirconium and/or titanium phosphate complex plus an amine or ammonium salt improves the properties of the pigments to a surprisingly and relatively high extent, especially in respect of gloss, dispersion stability, heat stability and rheological characteristics.

The present invention accordingly provides a pigment composition comprising an organic pigment whose particle surface is provided with an adhering coating layer, which coating layer comprises (a) a metal phosphate complex in which the metal is selected from the group consisting of calcium, magnesium, aluminium, zinc, zirconium, titanium and mixtures thereof in a quantity of from 0.5 to 100% by weight, preferably to 20% by weight, particularly preferably from 1 to 10% by weight, based on the pigment; and (b) at least one amine of the formula (I) or an ammonium salt of the formula (II)

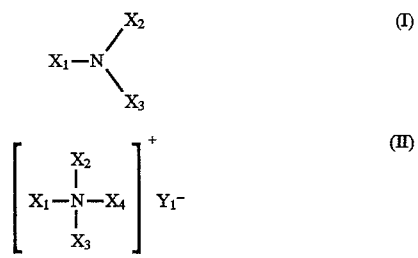

in which $X_1$, $X_2$, $X_3$ and, where present, $X_4$ independently of one another are an unsubstituted or substituted hydrocarbon radical or are hydrogen,
but $X_1$, $X_2$ and $X_3$ are not simultaneously hydrogen,
and, if $X_1$ and $X_2$ independently of one another are hydrogen, methyl or ethyl,
$X_3$ is not

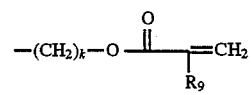

or a polymer or a copolymer thereof, in which k is a number from 1 to 6 and $R_9$ is hydrogen or methyl,
and $Y_1$ is the anion of an inorganic or organic acid, in a quantity of from 0.5 to 15% by weight, preferably up to 10% by weight, particularly preferably up to 5% by weight, based on the pigment.

The most advantageous quantity by weight of the coating depends in particular on the specific surface area of the pigment to be coated.

Where the metal is calcium, magnesium and/or zinc, the molar ratio of metal to phosphorus is preferably between 0.50 and 1.50, in particular between 0.90 and 1.10. Where the metal is aluminium, the molar ratio of metal to phosphorus is preferably between 0.20 and 1.00, in particular between 0.50 and 0.80. Where the metal is zirconium and/or titanium, the molar ratio of metal to phosphorus is preferably between 0.25 and 0.75, in particular between 0.45 and 0.55.

With regard to the metal in the metal phosphate complex, particular preference is given to zinc, zirconium, titanium or a mixture thereof.

Examples of inorganic or organic acids whose anion is suitable for the ammonium salts of the formula (II) are hydrochloric acid, hydrobromic acid, hydriodic acid, sulfuric acid, amidosulfuric acid, phosphoric acid, sodium dihydrogen phosphate, methylphosphonic acid, boric acid, tetrafluoroboric acid, formic acid, acetic acid, propionic acid, benzoic acid, phenylacetic acid, oxalic acid, malonic acid, succinic acid, phthalic acid, terephthalic acid, citric acid, methylsulfonic acid, ethylsulfonic acid, benzenesulfonic acid and toluenesulfonic acid.

Preferred amines of the formula (I) and ammonium salts of the formula (II) are those in which

| | |
|---|---|
| $X_1, X_2$ | independently of one another are —H or —$CH_2$—$R_1$, |
| | or $X_1$ and $X_2$ together are —$A_1$—N=C($R_2$)—, |
| $X_3$ | is —$CH_2$—$R_1$, 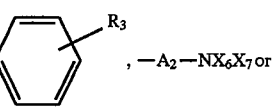, —$A_2$—$NX_6X_7$ or —$A_2$—$[NX_5X_6X_7]^+[Y_1]^-$, |
| $X_4, X_5$ | are —H, —$CH_3$, —$CH_2$—$CH_3$,  or —$CH_2$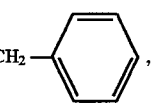, |
| $X_6, X_7$ | independently of $X_1$ to $X_3$ are —H or —$CH_2$—$R_1$, |
| | or $X_6$ and $X_7$ together are —$A_1$—N=C($R_2$)—, or $X_6$ is —H or —$CH_2$—$R_1$ and $X_7$ is ($A_2$—$NX_6$)$_m$—$A_2$—$NX_8X_9$ or |
| | ($A_2$—$[NX_5X_6]^+[Y_1]^-$)$_m$—$A_2$—$[NX_5X_8X_9]^+[Y_2]^-$, |
| $X_8, X_9$ | independently of one another are —H or —$CH_2$—$R_1$, |
| | or $X_8$ and $X_9$ together are —$A_1$—N=C($R_2$)—, |
| $Y_1, Y_2$ | independently of one another are $Cl^-$, $Br^-$, $I^-$, $HSO_4^-$, $HPO_4^{2-}$, $HCOO^-$ and $H_3CCOO^-$, |
| $R_1$ | is —H, —$C_1$-$C_{27}$alkyl, —$A_3$—$R_4$, , —$A_3$—$A_5$—$R_5$, —COOM, —$A_3$—COOM, —$A_3$—N($R_6$)—$A_4$—$NR_7R_8$, —$A_3$—O—$R_2$, —$A_3$—NHCO—$R_2$, —NHCO—$R_2$, —$A_3$(Si($CH_3$)$_2$—O)$_n$Si($CH_3$)$_2$—$A_3$—$NH_2$ or |
| | —$A_3$—$SO_2$—($CF_2$)$_p$—F, and also —CH=$CH_2$, —$A_3$—CH=$CH_2$, —$A_3$—OCO—C($R_9$)=$CH_2$ or a polymer or copolymer thereof, but not —($CH_2$)$_k$—OCO—C($R_9$)=$CH_2$ or a polymer or copolymer thereof, if $X_1$ and $X_2$ independently of one another are —H, —$CH_3$ or —$CH_2$—$CH_3$ and k is a number from 0 to 5, |
| $R_2$ | is —$C_1$-$C_{20}$alkyl, |
| $R_3$ | is —$NR_7R_8$, —COOM, —COO—$R_2$, 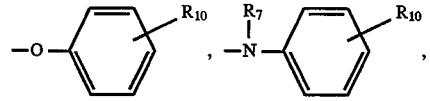, —$NX_6X_7$ or —$[NX_5X_6X_7]^+[Y_2]^-$, |
| $R_4$ | is —$OR_6$, —$NR_7R_8$,  or —N(—$A_7$—$R_5$)—$A_8$—$R_{11}$, |
| $R_5, R_{11}$ | independently of one another are —$OR_6$ or —$NR_7R_8$, |
| $R_6, R_7, R_8$ | independently of one another are —H, —$CH_3$ or —$C_2H_5$, |
| $R_9$ | is —H or —$CH_3$, |
| $R_{10}$ | is —H, —$OR_6$ or —$NR_7R_8$, |
| $A_1$ | is —$C_2$-$C_4$alkylene, |
| $A_2$ | is —$C_2$-$C_{10}$alkylene, |
| | —$A_4$—NHCONH—$A_4$—$NR_7$—$A_1$—O—$A_1$— or —$A_4$—NHCO—$A_3$—CONH—$A_4$—$NR_7$—$A_1$—O—$A_1$—, |

-continued

| | |
|---|---|
| $A_3$ | is —$C_1$-$C_{10}$alkylene, |
| $A_4$ | is —$C_2$-$C_{10}$alkylene, |
| $A_5$ | is a chain comprising q repeating units —O—$A_1$—, in which each $A_1$ in any repeating unit is independent of $A_1$ in the other repeating units, |
| $A_6$ | is —$A_1$—O—$A_1$—, —$A_1$—$NR_6$—$A_1$— or —$A_9$—, |
| $A_7$ | is a chain comprising r repeating units —O—$A_1$—, in which each $A_1$ in any repeating unit is independent of $A_1$ in the other repeating units, |
| $A_8$ | is —$A_7$— or a direct bond, |
| $A_9$ | is —$C_4$-$C_7$alkylene, |
| M | is —H, —K, —Li or —Na, |
| m | is a number from 1 to 3000, |
| n | is a number from 20 to 200, |
| p | is a number from 1 to 20, |
| q | is a number from 1 to 50, and |
| r | is a number from 1 to 20. |

$C_i$-$C_j$alkyl refers to linear or branched alkyl substituents comprising i to j carbon atoms. Examples of $C_1$-$C_5$alkyl are methyl, ethyl, propyl, isopropyl, n-butyl, sec-butyl, tert-butyl, n-amyl, sec-amyl or neopentyl. Examples of $C_6$-$C_{18}$alkyl are n-hexyl, trimethylpropyl, sec-hexyl, neohexyl, n-heptyl, isoheptyl, octyl, 2-ethylhexyl, 2,4,4-trimethylpentyl, nonyl, decyl, dodecyl, tetradecyl, hexadecyl or octadecyl. Examples of $C_{19}$-$C_{20}$alkyl are n-nonadecyl, 4-nonadecyl, n-eicosyl, 3-eicosyl or 7-eicosyl. An example of $C_{21}$alkyl is n-heneicosyl. Examples of $C_{22}$-$C_{27}$alkyl are n-docosyl, n-tetracosyl, n-hexacosyl or n-heptacosyl.

$C_i$-$C_j$alkylene refers to linear or branched alkylene substituents comprising i to j carbon atoms. $C_1$alkylene is methylene. Examples of $C_2$-$C_4$alkylene are ethylene, 1,2-propylene, 1,3-propylene, 1,2-butylene and 2,3-butylene. Examples of $C_5$alkylene are 1,2-amylene, 1,4-amylene and 1,3-(2,2-dimethyl)propylene Examples of $C_6$-$C_7$alkylene are 1,2-hexylene, 1,2-(3,3-dimethyl)butylene or 1,7-heptylene. Examples of $C_8$-$C_{10}$alkylene are octylene or decylene Examples of $C_{11}$-$C_{20}$alkylene are hendecylene, dodecylene, tetradecylene, hexadecylene or eicosylene.

Many of the amines of the formula (I) and ammonium salts of the formula (II) are commercially available, for example as dispersants whose structures and/or—where they are mixtures—compositions are often not specified precisely by the manufacturers. Examples, without in any way restricting the scope of the present invention, are 1,6-diaminohexane, 6-aminohexanol, 8amino-3,6-dioxaoctanol, 3-dimethylaminopropylamine, 3-diethylaminopropylamine, hexadecyltrimethylammonium bromide, octadecyltrimethylammonium bromide, 2-methyl-2-dodecylamine (PRIMENE® 81R, Rohm & Haas), N-coco-1,3-diaminopropane (DUOMEEN® C, Akzo), tallow-bis-2-hydroxyethylamine (ETHOMEEN® HT/12, Akzo), polyoxypropylenediamine (JEFFAMINE® D400, Texaco), polyethyleneimine (for example with $M_w$~50,000–60,000 as 50% aqueous solution, Aldrich), O-2-aminopropyl-O'-2-methoxymethyl-polypropylene glycols (for example with $M_w$~600), O,O'-bis(2-aminopropyl)-polypropylene glycols (for example with $M_w$~900), quaternary polyamines (for example GAFQUAT® 734, GAF), ethoxylated amines (for example SYMPERONIC® T-904 or SYMPERONIC® T-908, ICI), polyamines (for example INIPOL® PS, CECA), and polypropoxylated quaternary ammonium salts (for example EMCOL® CC9, Witco).

Among the preferred amines of the formula (I) and ammonium salts of the formula (II), particular preference is given to those amines and ammonium salts in which, in addition, one or, preferably, more simultaneously of the following conditions apply:

| | |
|---|---|
| $R_1$ | is $-H$, $-C_1-C_{27}$alkyl, $-A_3-R_4$, , $-A_3-A_5-R_5$, $-COOM$, $-A_{10}-COOM$, $-A_3-NH-A_4-NR_9R_{12}$, $-A_3-O-R_2$, $-A_{10}-NHCO-R_2$, $-NHCO-R_2$, $-A_1\!+\!Si(CH_3)_2-O\!+\!_{\overline{n}}Si(CH_3)_2-A_1-NH_2$ or $-A_3-SO_2-(CF_2)_p-F$, and also $-CH=CH_2$, $-A_3-CH=CH_2$, $-A_3-OCO-C(R_9)=CH_2$ or a polymer or copolymer thereof, but not $-(CH_2)_k-OCO-C(R_9)=CH_2$ or a polymer of copolymer thereof, if $X_1$ and $X_2$ independently of one another are $-H$, $-CH_3$ or $-CH_2CH_3$ and K is a number from 0 to 5, |
| $R_3$ | is $-N(CH_3)_2$, $-COOH$, $-COO-R_2$, $-O$, , $-NX_6X_7$ or $-[NX_5X_6X_7]^+[Y_2]^-$, |
| $R_6,R_7,R_8$ | independently of one another are $-H$ or $-CH_3$, |
| $R_9,R_{12}$ | independently of one another are $-H$ or $-CH_3$, especially $-H$, |
| $A_1$ | is $-CH_2-CH_2-$ or $-CH_2-CH(CH_3)-$, especially $-CH_2-CH_2-$, |
| $A_6$ | is $-CH_2-CH_2-O-CH_2-CH_2-$, $-CH_2-CH_2-NH-CH_2-CH_2-$ or $-(CH_2)_4-$, |
| $A_8$ | is $-A_7-$ or a direct bond, where $A_7$ and $A_8$ together comprise from 3 to 10 repeating units $-O-A_1-$, |
| $A_{10}$ | is $-C_1-C_5$alkylene, |
| p | is the number 8, and |
| r | is a number from 1 to 10. |

Very particular preference is given to those amines of the formula (I) and ammonium salts of the formula (II) in which

| | |
|---|---|
| $X_1,X_2$ | independently of one another are $-H$ or $-CH_2-R_1$, |
| $X_3$ | is $-CH_2-R_{13}$, $-A_{10}-NHX_7$ or $-A_{10}-[NHX_5X_7]^+[Y_1]^-$, |
| $X_4,X_5$ | is $-H$, $-CH_3$, $-C_2H_5$,  or $-CH_2-$⟨⟩, |
| $X_7$ | independently of $X_1$ to $X_3$ is $-H$, $-CH_2-R_1$, $+A_2-NH\!+\!_{\overline{m}}A_2-NX_8X_9$ or $+A_2-[NHX_5]^+[Y_1]^-\!+\!_{\overline{m}}A_2-[NX_5X_8X_9]^+[Y_2]^-$, |
| $X_8,X_9$ | independently of one another are $-H$ or $-CH_2-R_1$, |
| $Y_1,Y_2$ | are $Cl^-$, $Br^-$, $I^-$, $HSO_4^-$, $HPO_4^{2-}$, $HCOO^-$ and $H_3CCOO^-$, |
| $R_1$ | is $-H$, $-CH_3$, $-(CH_2)_s-CH_3$, $-A_{11}-NH_2$, , $-A_{11}-A_5-R_5$, $-COOM$, $-A_{13}-COOM$, $-A_{11}-NH-A_{10}-NH_2$, or $-A_{10}-NHCO-R_2$, |
| $R_2$ | is $-C_6-C_{18}$alkyl, |
| $R_5$ | is $-OR_6$ or $-NHR_7$, |
| $R_6,R_7,R_8$ | independently of one another are $-H$ or $-CH_3$, especially $-H$, |
| $R_{13}$ | is $-C_1-C_{21}$alkyl, $-A_3-NR_7R_8$ or $-A_{14}-A_{12}-R_5$, |
| $A_1$ | is $-CH_2-CH_2-$ or $-CH_2-CH(CH_3)-$, especially $-CH_2-CH_2-$, |
| $A_2$ | is $-C_2-C_4$alkylene, especially $-CH_2-CH_2-$, |
| $A_3$ | is $-C_1-C_{10}$alkylene, |
| $A_5$ | is a chain comprising q repeating units $-O-A_1-$, in which each $A_1$ in any repeating unit is independent of $A_1$ in the other repeating units, |
| $A_6$ | is $-A_1-O-A_1-$, $-A_1-NR_6-A_1-$ or $-A_9-$, |
| $A_{10}$ | is $-C_2-C_4$alkylene, especially $-CH_2-CH_2-CH_2-$, |
| $A_{11}$ | is $-C_1-C_5$alkylene, especially $-CH_2-$, |
| $A_{12}$ | is a chain comprising t repeating units $-O-A_1-$, in which each $A_1$ in any repeating unit is independent of $A_1$ in the other repeating units, |
| $A_{13}$ | is $-C_1-C_4$alkylene, |
| $A_{14}$ | is $-C_1C_5$alkylene, especially $-CH_2-CH_2-CH_2-$, |
| M | is $-H$, $-K$, $-Li$ or $-Na$, |
| m | is a number from 1 to 2000, |
| q | is a number from 2 to 5, especially 2 or 5, |
| s | is a number 6, 8, 10, 12, 14, 16 or 18, and |
| t | is a number from 10 to 30, especially 10, 15, 20, 25 or 30, | especially polyethyleneimine of $M_w$ 1000 to $M_w$ 70,000.

Advantageously, preferred metal phosphate complexes are combined with preferred amines or ammonium salts. Extraordinarily advantageous properties are possessed by those pigment compositions wherein the metal in the metal phosphate complex is zinc, zirconium, titanium or a mixture thereof and the amine or ammonium salt of the formula (I) or (II) is a polyethyleneimine of $M_w$ 1000 to $M_w$ 70,000.

In comparison with the simple combination of an organic pigment with an amine-type dispersant, the present invention has the advantage that the amines fulfil their purpose much better. This makes it possible, for a specific organic pigment in a specific case, to obtain better applications properties, to lower the quantity of the amine-type dispersant or to select those amines which can be used from a much wider range, for example inexpensive, mass-produced amines.

The choice of amine depends on the intended application of the pigment composition according to the invention; the person skilled in the art will be familiar with which classes of amine are suitable for which applications. For example, in polyolefins alkylamines are particularly suitable, while in polyethylene preference is given to those in which $X_3$ is —$CH_2$—$C_7$-$C_{27}$alkyl and $X_1$ and $X_2$ are —H. In particular, polyethyleneimine of $M_w$ 2000 to $M_w$ 70,000 is ideal in coating systems, preferably in stoving lacquers.

All customary organic pigments, for example quinophthalones, indanthrones, flavanthrones, pyranthrones, dioxazines, perinones, thioindigo, metal complexes and, in particular, diketopyrrolopyrroles, quinacridones, perylenes, anthraquinones, phthalocyanines, azo pigments, isoindolines and isoindolinones, are suitable for the preparation of the pigment compositions according to the invention. Preference is given to the quinacridones and azo pigments, and in particular to the diketopyrrolopyrroles.

The invention also provides a process for preparing pigment compositions according to the invention, which comprises treating (a') an organic pigment coated with from 0.5 to 100% by weight, based on the pigment, of an appropriate metal phosphate complex, with (b') from 0.5 to 15% by weight, preferably up to 10% by weight, particularly preferably up to 5% by weight, based on the pigment, of an appropriate amine or ammonium salt.

This treatment can take place by customary methods, for example by slurrying the metal phosphate-coated pigment and adding the desired quantity of amine or ammonium salt with stirring. The presence of a diluent is advantageous but not absolutely necessary. It is advantageous to use an inert diluent in which the amine dissolves at least partially. Preferred diluents are water or lower alkyl alcohols, for example methyl, ethyl, n-propyl, isopropyl, n-butyl, sec-butyl, tert-butyl or amyl alcohol, with water being particularly preferred.

The mixture is advantageously stirred at temperatures between 20° and 80° C., preferably at room temperature, for from 15 minutes to 2 hours.

Metal phosphate-coated pigments suitable as starting material (a') for this process can be obtained, for example, by dispersing the pigment by customary methods with a salt or chelate complex of calcium, magnesium, aluminium, zinc, zirconium and/or titanium in water or a lower alkyl alcohol or a mixture thereof, and then adding an aqueous solution of the phosphate ion donor compound with stirring.

In this method it is advantageous to choose amounts such that from 0.5 to 100% by weight of metal phosphate complex is formed, preferably up to 20%, particularly preferably from 1 to 10%, based on the pigment, at a preferred molar ratio of metal to phosphorus of between 0.25 and 0.75.

Another method for preparing metal phosphate-coated pigments which are suitable as starting material (a') for this process comprises first of all dispersing the pigment with the phosphate ion donor compound and then adding an aqueous solution of the metal salt or metal chelate complex, the calcium, magnesium, aluminium, zinc, zirconium and/or titanium phosphate complex being formed in situ on the surface of the pigment particles.

It is preferred first of all to disperse the pigment with the metal salt or metal chelate complex and then to add the solution of the phosphate ion donor compound.

In both cases the mixture is then advantageously stirred at temperatures of between 20° and 80° C., preferably at room temperature, for from 15 minutes to 2 hours.

Examples of suitable calcium, magnesium, aluminium and/or zinc salts are their chlorides, bromides, carbonates, nitrates or sulfates, such as calcium chloride, calcium bromide, calcium nitrate, magnesium chloride, magnesium carbonate, magnesium sulfate, aluminium nitrate, aluminium sulfate, zinc chloride or zinc sulfate. Examples of suitable calcium, magnesium, aluminium and/or zinc complexes are their acetates, citrates or acetylacetonates, such as calcium acetate, tricalcium dicitrate, magnesium acetate, trimagnesium dicitrate, aluminium acetate, aluminium acetylacetonate, zinc acetate or zinc acetylacetonate.

The calcium, magnesium, aluminium or zinc salt or complex preferably used is calcium chloride, calcium acetate, tricalcium dicitrate, magnesium chloride, magnesium acetate, trimagnesium dicitrate, aluminum sulfate, aluminium acetylacetonate, zinc sulfate, zinc acetate or zinc acetylacetonate.

Examples of suitable zirconium and/or titanium salts or complexes are zirconium sulfate, zirconium ammonium carbonate, zirconium acetate, zirconium propionate, zirconyl chloride, titanium(IV) chloride or titanyl sulfate and, in particular, the chelates of the formula

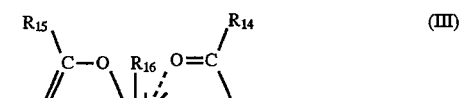

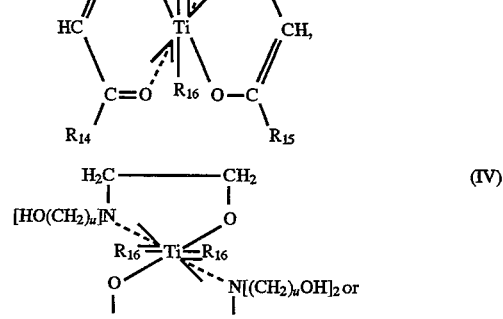

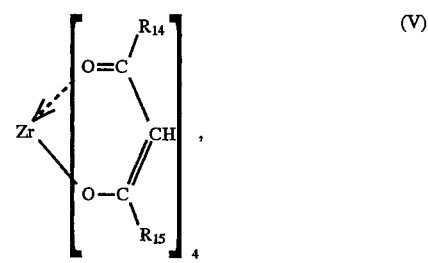

in which u is a number from 1 to 3, $R_{14}$ is methyl, ethyl, methoxy or ethoxy, $R_{15}$ is methyl or ethyl and $R_{16}$ is halogen or $C_1$–$C_4$alkoxy, and mixtures thereof.

Halogen is for example bromine, iodine and, in particular, chlorine. $C_1$–$C_4$alkoxy is for example methoxy, ethoxy, n-propoxy, isopropoxy, n-butoxy, sec-butoxy or tert-butoxy.

As zirconium or titanium salt it is preferred to use one of the chelates of the formulae (III), (IV) and (V), in which $R_{14}$ is preferably methyl or ethoxy, $R_{15}$ is preferably methyl, u is preferably 2 and $R_{16}$ is preferably $C_1$–$C_4$alkoxy, especially isopropoxy.

Particularly preferred zirconium and titanium salts are zirconium acetylacetonate, titanium acetylacetonate and titanium(IV) triethanolaminate.

Examples of suitable lower alkyl alcohols are methyl, ethyl, n-propyl, isopropyl, n-butyl, sec-butyl, tert-butyl and amyl alcohol. Dispersion is preferably carried out, however, in water without an alcohol.

The phosphate ions are preferably added in the form of ortho-, meta- or pyrophosphoric acid or salts thereof, especially alkali metal salts thereof.

Particularly suitable examples are orthophosphoric acid, orthophosphates, such as $MH_2PO_4$, $M_2HPO_4$ or $M_3PO_4$, metaphosphoric acid, Knorr's salt [$(NaPO_3)_3 \cdot 6H_2O$], Graham's salt [$(NaPO_3)_6$], Calgon [$(NaPO_3)_{12-13} \cdot Na_2O$], $M_2H_2P_2O_7$ and $M_4P_2O_7$, where M is Na, K or $NH_4$. Preference is given to orthophosphates, especially $Na_2HPO_4$ or $Na_3PO_4$.

Preference is given to the same metals and amines or ammonium salts also preferred as a component of the pigment compositions according to the invention.

The pigment compositions according to the invention can also be prepared from other pigment compositions according to the invention by replacing an amine or ammonium salt by another amine or ammonium salt.

The invention therefore additionally provides another process for preparing pigment compositions according to the invention, which comprises subjecting an organic pigment coated with an adhering coating comprising a metal phosphate complex and an amine or ammonium salt to treatment with an amine of the formula (I) or with an ammonium salt of the formula (II).

In this process, preference is given to the same amines or ammonium salts which are also preferred as a component of the pigment compositions according to the invention. It is particularly preferred to replace an amine or ammonium salt with an amine or ammonium salt which is less sterically hindered on the nitrogen.

The pigment compositions according to the invention can, however, also be prepared without isolating an intermediate, by staggered or simultaneous addition of the required starting materials.

The invention therefore also provides another, preferred process for preparing pigment compositions according to the invention, which comprises treating an organic pigment, simultaneously or in any desired sequence, with (a") calcium, magnesium, aluminium, zinc, zirconium and/or titanium salt or chelate complex, (b") a phosphate ion donor compound, and (c") an appropriate amine or ammonium salt.

In this process, components (a"), (b") and (c") can be added simultaneously or in succession in any desired sequence; preferred sequences are (a")-(b")-(c") and (b")-(a")-(c"), especially (a")-(b")-(c").

The calcium, magnesium, aluminium, zinc, zirconium and/or titanium salts or chelate complexes, phosphate ion donor compounds, amines, diluents and reaction conditions which are suitable for this process are the same as those indicated beforehand for the process for applying an adhering coating comprising a metal phosphate complex and an amine to a pigment surface, starting from a metal phosphate-coated pigment (a') and an amine (b'), or in the case of the preparation of organic pigments (a') coated with metal phosphate complexes.

The pigment compositions according to the invention are highly suitable for pigmenting high molecular weight organic materials, especially in the form of paints and printing inks. High molecular weight organic materials which can be coloured or pigmented with the compositions according to the invention are, for example, cellulose ethers and cellulose esters, such as ethylcellulose, nitrocellulose, cellulose acetate or cellulose butyrate, natural resins or synthetic resins, such as addition polymerization resins or condensation resins, such as amino resins, especially urea resins and melamine/formaldehyde resins, alkyd resins, phenolic resins, polycarbonates, polyolefins, polystyrenes, polyvinyl chloride, polyamides, polyurethanes, polyesters, rubber, caseine, silicone and silicone resins, individually or in mixtures.

Also suitable are high molecular weight organic materials in dissolved form as film formers, for example boiled linseed oil, nitrocellulose, alkyd resins, phenolic resins, melamine resins, acrylic resins and urea/formaldehyde resins.

Depending on the intended use it may prove advantageous to employ the pigment compositions according to the invention as toners or in the form of preparations. Based on the high molecular weight organic material to be pigmented, the pigment compositions according to the invention can be employed in a quantity of from 0.01 to 30% by weight, preferably from 0.1 to 10% by weight.

The pigmentation of the high molecular weight organic substances with the compositions according to the invention is carried out, for example, by admixing such a composition, in the form of master batches if desired, to these substrates using roller, mixing or milling apparatus. Subsequently, the pigmented material is brought into the desired final form by methods which are known per se, such as calendering, pressing, extrusion, coating, casting or injection moulding. It is often desirable, in order to produce nonrigid mouldings or to reduce their brittleness, to incorporate plasticizers into the high molecular weight compounds prior to deformation. Suitable such plasticizers can for example be esters of phosphoric acid, phthalic acid or sebacic acid. The plasticizers can be worked into the polymers before or after incorporation of the compositions according to the invention. It is also possible, in order to obtain different shades, to add to the high molecular weight organic materials not only the compositions according to the invention but also any desired quantity of fillers and/or other colouring constituents, such as white, coloured or black pigments.

For pigmenting paints and printing inks, the high molecular weight organic materials and the pigment compositions of the invention, together if desired with additives, such as fillers, other pigments, siccatives or plasticizers, are dispersed finely or dissolved in a mutual organic solvent or solvent mixture. One possible procedure here is to disperse or dissolve the individual components, individually or else two or more together, and only then to combine all the components.

The colourations obtained are distinguished by good general properties, for example high transparency, good fastness to overspraying and migration, and good heat, light and weathering stability.

The pigment compositions according to the invention are distinguished very particularly, however, by outstanding rheological characteristics, very good dispersibility and high dispersion stability in paint and printing ink systems, and by high gloss and excellent "DOI" (distinctness of image) of the coatings obtained therewith. In industrial coatings, the products of the invention exhibit excellent heat stability.

Because of the good rheological properties of the pigment compositions according to the invention, it is possible to produce paints with a high pigment concentration (high loadings).

In plastics, the products according to the invention are likewise distinguished by good dispersibility.

The pigment compositions according to the invention are primarily suitable for colouring aqueous and/or solvent borne paints, especially automotive paints, for example acrylic/melamine systems, alkyd/melamine systems, thermoplastic acrylic systems, stovable acrylic systems or aqueous automotive paint systems. They are likewise ideally suited for metallic finishes, for example those which comprise particles of aluminium or mica.

The examples which follow illustrate the invention. Percentages are by weight unless stated otherwise.

EXAMPLE 1

55.0 g of 1,4-diketo-2,5-dihydro-3,6-diphenylpyrrolo[3,4-c]pyrrole of the formula

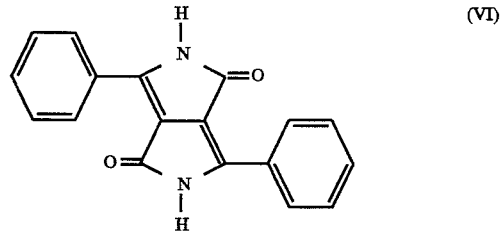

are dispersed with 11.4 g of zirconium(IV) acetylacetonate in 500 ml of water. A solution of 16.7 g of $Na_2HPO_4 \cdot 12H_2O$ in 100 ml of water is added to this suspension by means of a pump, with stirring, over the course of 105 minutes. The suspension is then filtered and the residue is washed with water.

EXAMPLES 2–11

5.6 g of a 53.0% filter cake of the product obtained in Example 1 are dispersed in 150 ml of water. A suspension of the quantity of amine indicated below in 40 ml of water is then added to said pigment dispersion. The suspension is stirred at 60° C. for 2 hours and filtered, and the residue is washed with water, dried at 80° C. and pulverized.

pyrrole, 0.5 g of zirconium (IV) acetylacetonate and 0.3 g of $Na_2HPO_4 \cdot 12H_2O$ in a total of 300 ml of water. The filter cake is subsequently dried at 80° C. and pulverized.

| Example | Quantity | Amine | Tradename |
|---|---|---|---|
| 2 | 0.7 g | N-tallow-1,3-diaminopropane | DUOMEEN ® T (Akzo) |
| 3 | 1.0 g | N-coco-1,3-diaminopropane | DUOMEEN ® C (Akzo) |
| 4 | 0.7 g | tallow-bis-2-hydroxyethylamine | ETHOMEEN ® HT/12 (Akzo) |
| 5 | 0.45 g | 2-methyl-2-dodecylamine | PRIMENE ® 81R (Rohm & Haas) |
| 6 | 0.7 g | O-2-aminopropyl-O'-2-methoxymethyl-polypropylene glycol [$M_w$ ~600] | |
| 7 | 0.7 g | O,O'-bis(2-aminopropyl)-polypropylene glycol [$M_w$ ~900] | |
| 8 | 0.8 g | octadecyltrimethylammonium bromide | |
| 9 | 0.3 g | 8-amino-3,6-dioxaoctanol | |
| 10 | 0.23 g | 3-dimethylaminopropylamine | |
| 11 | 0.7 g | polyoxypropylenediamine | JEFFAMINE ® D400 (Texaco) |

EXAMPLE 12

63.5 g of a 31.5% filter cake of 1,4-diketo-2,5-dihydro-3,6-di(4'-tert-butyl)phenylpyrrolo[3,4-c]pyrrole of the formula

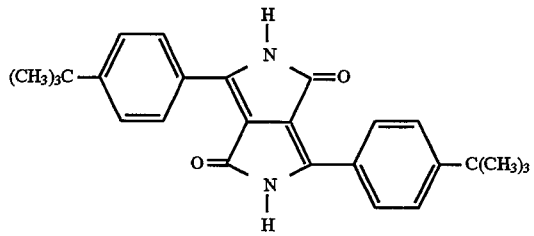

(VII)

(prepared for example in accordance with U.S. Pat. No. 4,579,949) are dispersed with 4.8 g of zirconium(IV) acetylacetonate in 132 ml of water. A solution of 70.5 g of $Na_2HPO_4 \cdot 12H_2O$ in 100 ml of water is added to this suspension by means of a pump, with stirring, over the course of 2½ hours. The suspension is then filtered and the residue is washed with water, dried at 80° C. and pulverized.

EXAMPLES 13–15

3.0 g of the product obtained in Example 12 are dispersed in 100 ml of water. A suspension of the quantity of amine indicated below in 40 ml of water is then added to said pigment dispersion. The suspension is stirred at 60° C. for 2 hours and filtered, and the residue is washed with water, dried at 80° C. and pulverized.

EXAMPLES 17–27

3.0 g of the product obtained in Example 16 are dispersed in 100 ml of water. A suspension of the quantity of amine indicated below in 40 ml of water is then added to said pigment dispersion. The suspension is stirred at room temperature for 2 hours and filtered, and the residue is washed with water, dried at 80° C. and pulverized.

| Example | Quantity | Amine | Tradename |
|---|---|---|---|
| 13 | 1.0 g | O-(2-aminopropyl)-O'-2-methoxyethyl-polypropylene glycol [$M_w$ ~600] | |
| 14 | 0.75 g | polyoxypropylenediamine | JEFFAMINE ® D400 (Texaco) |
| 15 | 0.2 g | 3-dimethylaminopropylamine | |

EXAMPLE 16

The procedure of Example 1 is followed but starting from 28.8 g of 1,4-diketo-2,5-dihydro-3,6-diphenylpyrrolo[3,4-c]

| Example | Quantity | Amine | Tradename |
|---|---|---|---|
| 17 | 0.3 g | polyethyleneimine (50% in $H_2O$) | (Aldrich) [$M_w$ 50,000 ÷ 60,000] |
| 18 | 0.13 g | 2-methyl-2-dodecylamine | PRIMENE ® 81R (Rohm & Haas) |

-continued

| Example | Quantity | Amine | Tradename |
|---|---|---|---|
| 19 | 0.25 g | hexadecyltrimethylammonium bromide | |
| 20 | 0.3 g | quaternary, polyamine | GAFQUAT ® 734 (GAF) |
| 21 | 0.4 g | O-2-aminopropyl-O'-2-methoxyethyl-polypropylene glycol [$M_w$ ~600] | |
| 22 | 0.1 g | diaminohexane | |
| 23 | 0.15 g | ethoxylated amine | SYMPERONIC ® T-908 (ICI) |
| 24 | 0.15 g | ethoxylated amine | SYMPERONIC ® T-904 (ICI) |
| 25 | 0.1 g | 6-aminohexanol | |
| 26 | 0.15 g | polyamine | INIPOL ® PS (CECA) |
| 27 | 0.15 g | polypropoxylated quaternary ammonium salt | EMCOL ® CC9 (Witco) |

EXAMPLE 28

The procedure of Example 1 is followed but starting from 28.8 g of 1,4-diketo-2,5-dihydro-3,6-diphenylpyrrolo[3,4-c]pyrrole, 1.0 g of zirconium(IV) acetylacetonate and 0.6 g of $Na_2HPO_4 \cdot 12H_2O$ in a total of 300 ml of water. The filter cake is subsequently dried at 80° C. and pulverized.

EXAMPLES 29–39

The procedure of Examples 17–27 is followed but using in each case twice the quantity of amine compared to that indicated in Examples 17–27.

EXAMPLE 40

27.2 g of a 36.8% filter cake of 1,4-diketo-2,5-dihydro-3,6-diphenylpyrrolo[3,4-c]pyrrole of the formula

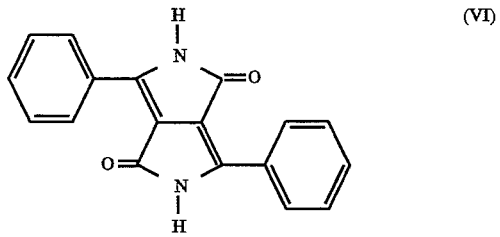

(VI)

are dispersed with 0.8 g of aluminium(III) acetylacetonate in 70 ml of water. A solution of 1.76 g of $Na_2HPO_4 \cdot 12H_2O$ in 20 ml of water is added to this suspension by means of a pump, with stirring, over the course of 105 minutes. The suspension is then filtered and the residue is washed with water, dried at 80° C. and pulverized.

EXAMPLE 41

2.0 g of the product obtained in Example 40 are dispersed in 60 ml of water. A suspension of 0.10 g of polyethyleneimine [$M_w$~25,000] in 20 ml of water is then added to said pigment dispersion. The suspension is stirred at 60° C. for 16 hours and filtered, and the residue is washed with water, dried at 80° C. and pulverized.

EXAMPLE 42

The procedure of Example 40 is followed but starting from 27.2 g of 1,4-diketo-2,5-dihydro-3,6-diphenylpyrrolo[3,4-c]pyrrole filter cake, 0.80 g of $CaCl_2$ and 2.60 g of $Na_2HPO_4 \cdot 12H_2O$ in a total of 90 ml of water.

EXAMPLE 43

The procedure of Example 40 is followed but starting from 27.2 g of 1,4-diketo-2,5-dihydro-3,6-diphenylpyrrolo[3,4-c]pyrrole filter cake, 2.58 g of $Al_2(SO_4)_3 \cdot 16H_2O$ and 2.94 g of $Na_2HPO_4 \cdot 12H_2O$ in a total of 110 ml of water.

EXAMPLE 44

The procedure of Example 40 is followed but starting from 27.2 g of 1,4-diketo-2,5-dihydro-3,6-diphenylpyrrolo[3,4-c]pyrrole filter cake, 2.66 g of aluminium(III) acetylacetonate and 2.49 g of $Na_2HPO_4 \cdot 12H_2O$ in total of 110 ml of water.

EXAMPLES 45–47

The procedure of Example 41 is followed but using the products of Examples 42–44 instead of the product of Example 40.

EXAMPLE 48

2 g of the product obtained in Example 1 and 48 g of a stoving lacquer consisting of 56 g of alkyd resin ALKYDAL® F310 (Bayer AG; 60% in xylene)

13 g of melamine resin CYMEL® 327 (Cyanamid; 90% in butanol)

25 g of xylene 25 g of butanol 2.5 g of 1-methoxy-2-propanol, and 1 g of silicone oil (1% in xylene)

are mixed by conventional methods. The resulting paint is applied by being run onto a glass plate. The glass plate is flashed off for about 30 minutes at 25° inclination and then stoved in a convection oven (30 minutes at 120° C.).

The gloss values are measured with a gloss meter (Zehntner ZGM 1020®) at 20° in accordance with DIN 67 530.

The resulting coating gives a quite astonishingly improved gloss in comparison to a coating obtained with an uncoated pigment.

EXAMPLES 49–67

The procedure of Example 40 is followed but using, instead of the product of Example 1, the products of examples 5, 8, 9, 10, 15, 17, 18, 22, 23, 26, 29, 30, 34, 35, 38, 41, 45, 46 and 47. In every case approximately equivalent results are obtained with a quite surprising improvement in gloss in relation to coatings obtained with uncoated pigment.

EXAMPLE 68

27.2 g of a 36.8% filter cake of 1,4-diketo-2,5-dihydro-3,6-diphenylpyrrolo[3,4-c]pyrrole are dispersed with 0.82 g of $CaCl_2$ in 70 ml of water. A solution of 2.63 g of $Na_2HPO_4 \cdot 12 H_2O$ in 40 ml of water is added to this suspension by means of a pump, with stirring, over the course of 105 minutes. The suspension is then filtered and the residue is washed with water, dried at 80° C. and pulverized.

EXAMPLE 69

2 g of the product obtained in Example 68 are dispersed in 60 ml of water. A suspension of 0.1 g of polyethyleneimine ($M_w$~25,000) in 20 ml of water is then added to said pigment dispersion. The suspension is stirred for 16 hours and then filtered, the residue is washed with water, dried at 80° C. and pulverized.

EXAMPLE 70

83.3 g of a 36.0% filter cake of C.I. Pigment Blue 15:4 (a phthalocyanine pigment) are suspended in 97.7 ml of water. 7.5 g of zirconium(IV) acetylacetonate are then added to this pigment dispersion. The suspension is placed into a thick-walled vessel, 200 g of glass beads (diameter 2 mm) are added, and the mixture is dispersed overnight at a high rotary speed with vigorous mechanical stirring. A solution of 4.40 g of anhydrous $Na_2HPO_4$ in 25 ml of water is then added by means of a pump, with further stirring, over the course of 15 minutes, with the viscosity showing a sharp increase after about a third has been added. After stirring for one hour more, the suspension is separated from the glass beads by sieving and then filtered, and the residue is washed with water.

EXAMPLE 71

The washed, moist filter cake obtained in Example 70 is resuspended in a quantity of water such that the total volume is about 300 ml. For complete dispersion, the suspension is stirred for about half an hour. Then 0.9 g of butylamine is added and the mixture is subsequently heated to 60° C. After 4 hours the suspension is filtered, and the residue is washed with water, dried at 60° C. and pulverized.

EXAMPLE 72

27.2 g of a 36.8% filter cake of 1,4-diketo-2,5-dihydro-3,6-diphenylpyrrolo[3,4-c]pyrrole are dispersed with 0.84 g of $ZnCl_2$ in 70 ml of water. A solution of 2.2 g of $Na_2HPO_4$·12 $H_2O$ in 20 ml of water is added to this suspension by means of a pump, with stirring, over the course of 105 minutes. The suspension is then filtered and the residue is washed with water, dried at 80° C. and pulverized.

EXAMPLE 73

5 g of the product obtained in Example 72 are dispersed in 60 ml of water. A suspension of 0.25 g of polyethyleneimine ($M_w$~25,000) in 20 ml of water is then added to said pigment dispersion. The suspension is stirred for 16 hours and then filtered, the residue is washed with water, dried at 80° C. and pulverized.

EXAMPLE 74

27.2 g of a 36.8% filter cake of 1,4-diketo-2,5-dihydro-3,6-diphenylpyrrolo[3,4-c]pyrrole are dispersed with 1.36 g of $Zn(OOC-CH_3)_2$ in 70 ml of water. A solution of 2.2 g of $Na_2HPO_4$·12 $H_2O$ in 20 ml of water is added to this suspension by means of a pump, with stirring, over the course of 105 minutes. The suspension is then filtered and the residue is washed with water, dried at 80° C. and pulverized.

EXAMPLE 75

5 g of the product obtained in Example 74 are dispersed in 60 ml of water. A suspension of 0.25 g of polyethyleneimine ($M_w$~25,000) in 20 ml of water is then added to said pigment dispersion. The suspension is stirred for 16 hours and then filtered, the residue is washed with water, dried at 80° C. and pulverized.

EXAMPLE 76

1.24 g of acetylacetone am dissolved in 70 ml of water. A solution of 1.78 g of $ZnSO_4$·7 $H_2O$ in 20 ml of water is added and then the pH is raised from about 3.8 to 7 with dilute aqueous sodium hydroxide solution, whereupon $Zn(acac)_4$·{aq.} precipitates. 27.2 g of a 36.8% filter cake of 1,4-diketo-2,5-dihydro-3,6-diphenylpyrrolo[3,4-c]pyrrole are dispersed in this suspension. A solution of 2.2 g of $Na_2HPO_4$·12 $H_2O$ in 20 ml of water is subsequently added by means of a pump, with stirring, over the course of 105 minutes. The suspension is then filtered and the residue is washed with water, dried at 80° C. and pulverized.

EXAMPLE 77

5 g of the product obtained in Example 76 are dispersed in 60 ml of water. A suspension of 0.25 g of polyethyleneimine ($M_w$~25,000) in 20 ml of water is then added to said pigment dispersion. The suspension is stirred for 16 hours and then filtered, the residue is washed with water, dried at 80° C. and pulverized.

What is claimed is:

1. A pigment composition comprising an organic pigment whose particle surface is provided with an adhering coating layer, which coating layer comprises (a) a metal phosphate complex in which the metal is selected from the group consisting of calcium, magnesium, aluminium, zinc, zirconium, titanium and mixtures thereof in a quantity of from 0.5 to 100% by weight, based on the pigment; and (b) at least one amine of the formula (I) or an ammonium salt of the formula (II)

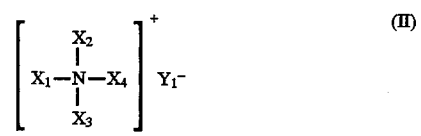

in which $X_1$, $X_2$, $X_3$ and, where present, $X_4$ independently of one another are an unsubstituted or substituted hydrocarbon radical or are hydrogen, but $X_1$, $X_2$ and $X_3$ are not simultaneously hydrogen, and, if $X_1$ and $X_2$ independently of one another are hydrogen, methyl or ethyl, $X_3$ is not

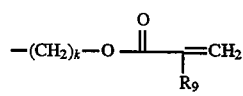

or a polymer or a copolymer thereof, in which k is a number from 1 to 6 and $R_9$ is hydrogen or methyl, and $Y_1$ is the anion of an inorganic or organic acid, in a quantity of from 0.5 to 15% by weight, based on the pigment.

2. A pigment composition according to claim 1, in which the pigment is selected from the group consisting of quinacridone, perylene, anthraquinone, phthalocyanine, azo, isoindoline, isoindolinone and diketopyrrolopyrrole.

3. A pigment composition according to claim 2, in which the pigment is selected from the group consisting of quinacridone, azo and diketopyrrolopyrrole.

4. A pigment composition according to claim 3, in which the pigment is a selected group consisting of diketopyrrolopyrrole.

5. A pigment composition according to claim 1, in which the metal in the metal phosphate complex is zinc, zirconium, titanium or a mixture thereof.

6. A pigment composition according to claim 1, in which component (a) is present in a quantity of from 0.5 to 20% by weight, based on the pigment.

7. A pigment composition according to claim 1, in which component (a) is present in a quantity of from 1 to 10% by weight, based on the pigment.

8. A pigment composition according to claim 1, in which component (b) is present in a quantity of from 0.5 to 10% by weight, based on the pigment.

9. A pigment composition according to claim 1, in which component (b) is present in a quantity of from 0.5 to 5% by weight, based on the pigment.

10. A pigment composition according to claim 1, in which

| | |
|---|---|
| $X_1, X_2$ | independently of one another are $-H$ or $-CH_2-R_1$, |
| | or $X_1$ and $X_2$ together are $-A_1-N=C(R_2)-$, |
| $X_3$ | is $-CH_2-R_1$,  , $-A_2-NX_6X_7$ or $-A_2-[NX_5X_6X_7]^+[Y_1]^-$, |
| $X_4, X_5$ | are $-H$, $-CH_3$, $-CH_2-CH_3$, 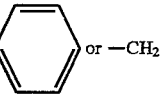 or $-CH_2$ , |
| $X_6, X_7$ | independently of $X_1$ to $X_3$ are $-H$ or $-CH_2-R_1$, |
| | or $X_6$ and $X_7$ together are $-A_1-N=C(R_2)-$, |
| | or $X_6$ is $-H$ or $-CH_2-R_1$ and $X_7$ is $(-A_2-NX_6-)_m A_2-NX_8X_9$ or |
| | $(-A_2-[NX_5X_6]^+[Y_1]^-)_m A_2-[NX_5X_8X_9]^+[Y_2]^-$, |
| $X_8, X_9$ | independently of one another are $-H$ or $-CH_2-R_1$, |
| | or $X_8$ and $X_9$ together are $-A_1-N=C(R_2)-$, |
| $Y_1, Y_2$ | independently of one another are $Cl^-$, $Br^-$, $I^-$, $HSO_4^-$, $HPO_4^{2-}$, $HCOO^-$ and $H_3CCOO^-$, |
| $R_1$ | is $-H$, $-C_1-C_{27}$alkyl, $-A_3-R_4$, , $-A_3-A_5-R_5$, $-COOM$, $-A_3-COOM$, |
| | $-A_3-N(R_6)-A_4-NR_7R_8$, $-A_3-O-R_2$, $-A_3-NHCO-R_2$, $-NHCO-R_2$, |
| | $-A_3(-Si(CH_3)_2-O-)_n Si(CH_3)_2-A_3-NH_2$ or $-A_3-SO_2-(CF_2)_p-F$, and |
| | also $-CH=CH_2$, $-A_3-CH=CH_2$, $-A_3-OCO-C(R_9)=CH_2$ or a polymer or copolymer thereof, but not $-(CH_2)_k-OCO-C(R_9)=CH_2$ or a polymer or copolymer thereof, if $X_1$ and $X_2$ independently of one another are $-H$, $-CH_3$ or $-CH_2-CH_3$ and k is a number from 0 to 5, |
| $R_2$ | is $-C_1-C_{20}$alkyl, |
| $R_3$ | is $-NR_7R_8$, $-COOM$, $-COO-R_2$, $-O$ 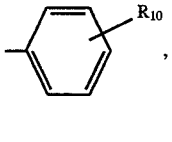, $-N$ 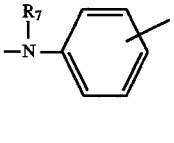, $-NX_6X_7$ or |
| | $-[NX_5X_6X_7]^+[Y_2]^-$, |
| $R_4$ | is $-OR_6$, $-NR_7R_8$,  or $-N(-A_7-R_5)-A_8-R_{11}$, |
| $R_5, R_{11}$ | independently of one another are $-OR_6$ or $-NR_7R_8$, |
| $R_6, R_7, R_8$ | independently of one another are $-H$, $-CH_3$ or $-C_2H_5$, |
| $R_9$ | is $-H$ or $-CH_3$, |
| $R_{10}$ | is $-H$, $-OR_6$ or $-NR_7R_8$, |
| $A_1$ | is $-C_2-C_4$alkylene, |
| $A_2$ | is $-C_2-C_{10}$alkylene, $-A_4-NHCONH-A_4-NR_7-A_1-O-A_1-$ or |

-continued

—A₄—NHCO——A₃—CONH—A₄—NR₇—A₁—O—A₁—,

| A₃ | is —C₁–C₁₀alkylene, |
| A₄ | is —C₂–C₁₀alkylene, |
| A₅ | is a chain comprising q repeating units —O—A₁—, in which each A₁ in any repeating unit is independent of A₁ in the other repeating units, |
| A₆ | is —A₁—O—A₁—, —A₁—NR₆—A₁— or —A₉—, |
| A₇ | is a chain comprising r repeating units —O—A₁—, in which each A₁ in any repeating unit is independent of A₁ in the other repeating units, |
| A₈ | is —A₇— or a direct bond, |
| A₉ | is —C₄–C₇alkylene, |
| M | is —H, —K, —Li or —Na, |
| m | is a number from 1 to 3000, |
| n | is a number from 20 to 200, |
| p | is a number from 1 to 20, |
| q | is a number from 1 to 50, and |
| r | is a number from 1 to 20. |

11. A pigment composition according to claim 10, in which

| X₁, X₂ | independently of one another are —H or —CH₂—R₁, |
| X₃ | is —CH₂—R₁₃, —A₁₀—NHX₇ or —A₁₀—[NHX₅X₇]⁺[Y₁]⁻, |
| X₄, X₅ | is —H, —CH₃, —C₂H₅,  or 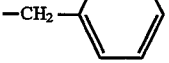, |
| X₇ | independently of X₁ to X₃ is —H, —CH₂—R₁, ⁺(A₂—NH)ₘ̄A₂—NX₈X₉ or ⁺(A₂—[NHX₅]⁺[Y₁]⁻)ₘ̄A₂—[NX₅X₈X₉]⁺[Y₂]⁻, |
| X₈, X₉ | independently of one another are —H or —CH₂—R₁, |
| Y₁, Y₂ | are Cl⁻, Br⁻, I⁻, HSO₄⁻, HPO₄²⁻, HCOO⁻ and H₃CCOO⁻, |
| R₁ | is —H, —CH₃, —(CH₂)ₛ—CH₃, —A₁₁—NH₂, , —A₁₁—A₅—R₅, —COOM, —A₁₃—COOM, —A₁₁—NH—A₁₀—NH₂, or —A₁₀—NHCO—R₂, |
| R₂ | is —C₆–C₁₈alkyl, |
| R₅ | is —OR₆ or —NHR₇, |
| R₆, R₇, R₈ | independently of one another are —H or —CH₃, |
| R₁₃ | is —C₁–C₂₁alkyl, —A₃—NR₇R₈ or —A₁₄—A₁₂—R₅, |
| A₁ | is —CH₂—CH₂— or —CH₂—CH(CH₃)—, |
| A₂ | is —C₂–C₄alkylene, |

-continued

| A₃ | is —C₁–C₁₀alkylene, |
| A₅ | is a chain comprising q repeating units —O—A₁—, in which each A₁ in any repeating unit is independent of A₁ in the other repeating units, |
| A₆ | is —A₁—O—A₁—, —A₁—NR₆—A₁— or —A₉—, |
| A₁₀ | is —C₂–C₄alkylene, |
| A₁₁ | is —C₁–C₅alkylene, |
| A₁₂ | is a chain comprising t repeating units —O—A₁—, in which each A₁ in any repeating unit is independent of A₁ in the other repeating units, |
| A₁₃ | is —C₁–C₄alkylene, |
| A₁₄ | is —C₁–C₅alkylene, |
| M | is —H, —K, —Li or —Na, |
| m | is a number from 1 to 2000, |
| q | is a number from 2 to 5, |
| s | is a number 6, 8, 10, 12, 14, 16, or 18, and |
| t | is a number from 10 to 30. |

12. A pigment composition according to claim 11, in which

| R₆, R₇ or R₈ | is —H, |
| A₁ or A₂ | is —CH₂—CH₂—, |

-continued $A_{10}$ or $A_{14}$ is $-CH_2-CH_2-CH_2-$, $A_{11}$ is $-CH_2-$, q is a number 2 or 5, or t is a number 10, 15, 20, 25 or 30.

13. A pigment composition according to claim 1, in which the amine of the formula (I) used is a polyethyleneimine of $M_w$ 1000 to $M_w$ 70,000.

14. A pigment composition according to claim 5, in which the amine of the formula (I) used is a polyethyleneimine of $M_w$ 1000 to $M_w$ 70,000.

15. A process for preparing a pigment composition according to claim 1, which comprises treating (a') an organic pigment coated with from 0.5 to 100% by weight, based on the pigment, of an appropriate metal phosphate complex, with (b') from 0.5 to 15% by weight, of an appropriate amine or ammonium salt, based on the pigment.

16. A process according to claim 15, which comprises subjecting an organic pigment coated with an adhering coating comprising a metal phosphate complex and an amine or ammonium salt to treatment with an amine of the formula (I) or with an ammonium salt of the formula (II).

17. A process according to claim 15, which comprises treating an organic pigment, simultaneously or in any sequence, with (a") an appropriate calcium, magnesium, aluminium, zinc, zirconium and/or titanium salt or chelate complex, (b") a phosphate ion donor compound, and (c") an appropriate amine or ammonium salt.

18. A process according to claim 17, in which the additives (a"), (b") and (c") are added in the sequence (a")-(b")-(c").

19. A process according to claim 17, in which calcium chloride, calcium acetate, tricalcium dicitrate, magnesium chloride, magnesium acetate, trimagnesium dicitrate, aluminium sulfate, aluminium acetylacetonate, zinc sulfate, zinc acetate or zinc acetylacetonate is used.

20. A process according to claim 17, in which a zirconium salt or titanium salt or complex selected from zirconium sulfate, zirconium ammonium carbonate, zirconium acetate, zirconium propionate, zirconyl chloride, titanium(IV) chloride or titanyl sulfate, or a chelate of the formula

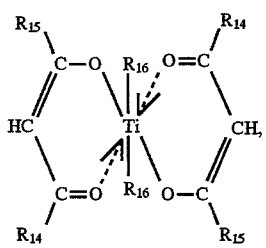
(III)

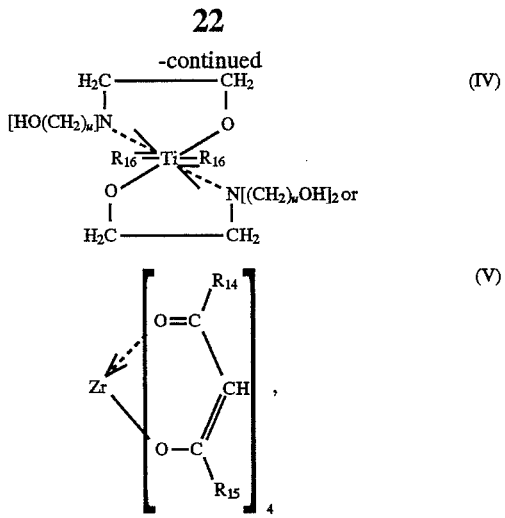
(IV)

(V)

in which u is a number from 1 to 3, $R_{14}$ is methyl, ethyl, methoxy or ethoxy, $R_{15}$ is methyl or ethyl and $R_{16}$ is halogen or $C_1-C_4$alkoxy, or a mixture thereof, is used.

21. A process according to claim 20, in which a chelate of the formula (III), (IV) or (V) is used.

22. A process according to claim 21, in which $R_{14}$ is methyl or ethoxy, $R_{15}$ is methyl, u is 2 and $R_{16}$ is $C_1-C_4$alkoxy.

23. A process according to claim 22, in which $R_{16}$ is isopropoxy.

24. A process according to claim 17, in which a phosphate ion donor compound selected from orthophosphoric acid, $MH_2PO_4$, $M_2HPO_4$, $M_3PO_4$, metaphosphoric acid, Knorr's salt $[(NaPO_3)_3 \cdot 6H_2O]$, Graham's salt $[(NaPO_3)_6]$, Calgon $[(NaPO_3)_{12-13} \cdot Na_2O]$, $M_2H_2P_2O_7$ and $M_4P_2O_7$, where M is Na, K or $NH_4$, is used.

25. A process according to claim 24, in which an orthophosphate is used.

26. A process according to claim 25, in which $Na_2HPO_4$ or $Na_3PO_4$ is used.

27. A high molecular weight organic material comprising a pigment composition which comprises an organic pigment whose particle surface is provided with an adhering coating layer, which coating layer comprises (a) a metal phosphate complex in which the metal is selected from the group consisting of calcium, magnesium, aluminium, zinc, zirconium, titanium and mixtures thereof in a quantity of from 0.5 to 100% by weight, based on the pigment; and (b) at least one amine of the formula (I) or an ammonium salt of the formula (II)

(I)

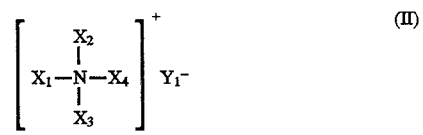
(II)

in which $X_1, X_2, X_3$ and, where present, $X_4$ independently of one another are an unsubstituted or substituted hydrocarbon radical or are hydrogen, but $X_1, X_2$ and $X_3$ are not simultaneously hydrogen, and, if $X_1$ and $X_2$ independently of one another are hydrogen, methyl or ethyl, $X_3$ is not

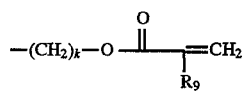

or a polymer or a copolymer thereof, in which k is a number from 1 to 6 and $R_9$ is hydrogen or methyl, and $Y_1$ is the anion of an inorganic or organic acid, in a quantity of from 0.5 to 15% by weight, based on the pigment.

28. A high molecular weight organic material according to claim 27, which is a paint or a printing ink.

29. A high molecular weight organic material according to claim 28, which is a paint in which the amine of the formula (I) used is a polyethyleneimine of $M_w$ 2,000 to $M_w$ 70,000.

30. A high molecular weight organic material according to claim 28, which is an automotive paint.

31. A high molecular weight organic material according to claim 28, which is a special-effect coating.

* * * * *